(12) United States Patent
Nakamura

(10) Patent No.: US 7,961,211 B2
(45) Date of Patent: Jun. 14, 2011

(54) OPTICAL SCANNING DEVICE AND IMAGE FORMING APPARATUS

(75) Inventor: Tadashi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 14 days.

(21) Appl. No.: 12/361,812

(22) Filed: Jan. 29, 2009

(65) Prior Publication Data
US 2009/0201358 A1 Aug. 13, 2009

(30) Foreign Application Priority Data

Feb. 12, 2008 (JP) ................. 2008-029972

(51) Int. Cl.
B41J 2/47 (2006.01)
(52) U.S. Cl. ....................................... 347/254
(58) Field of Classification Search .................. 347/248, 347/258, 236–239, 246–247, 251–255
See application file for complete search history.

(56) References Cited

U.S. PATENT DOCUMENTS

| 5,489,936 | A | * | 2/1996 | Appel et al. | ................... 347/248 |
| 6,081,386 | A | * | 6/2000 | Hayashi et al. | ............... 359/641 |
| 6,995,885 | B2 | * | 2/2006 | Nakajima | ................... 359/213.1 |
| 7,599,105 | B2 | * | 10/2009 | Nakajima | ................... 359/220.1 |
| 2007/0297036 | A1 | | 12/2007 | Nakamura et al. | |
| 2008/0055690 | A1 | | 3/2008 | Nakamura et al. | |
| 2008/0062491 | A1 | | 3/2008 | Nakamura et al. | |
| 2008/0144132 | A1 | * | 6/2008 | Koga | ........................... 358/475 |
| 2008/0192323 | A1 | | 8/2008 | Nakamura et al. | |
| 2008/0204841 | A1 | | 8/2008 | Suzuki et al. | |
| 2008/0218829 | A1 | | 9/2008 | Nakamura | |
| 2009/0015897 | A1 | | 1/2009 | Nakamura et al. | |

FOREIGN PATENT DOCUMENTS

| JP | 07266612 A | * | 10/1995 |
| JP | 11174361 A | * | 7/1999 |
| JP | 2002-82303 | | 3/2002 |
| JP | 2005-215571 | | 8/2005 |
| JP | 2007-292918 | | 11/2007 |

OTHER PUBLICATIONS

U.S. Appl. No. 12/204,483, filed Sep. 4, 2008, Nakamura.

* cited by examiner

Primary Examiner — Hai C Pham
(74) Attorney, Agent, or Firm — Oblon, Spivak, McClelland, Maier & Neustadt, L.L.P.

(57) ABSTRACT

An optical scanning device includes a light source; a light source driving unit configured to modulate/drive the light source; a pulse width information holding unit configured to hold pulse width information items of predetermined pixels corresponding to scanning positions on a scan target surface; a deflecting unit including a reflection surface configured to deflect/scan a light beam from the light source; and a scan-imaging optical system configured to image the light beam deflected by the deflecting unit on the scan target surface. The pulse width information holding unit holds the pulse width information items which cancel out deviations of main scanning beam spot diameters among the scanning positions on the scan target surface; and the light source driving unit drives the light source based on the pulse width information items held by the pulse width information holding unit.

13 Claims, 11 Drawing Sheets

OPTICAL SCANNING DEVICE AND IMAGE FORMING APPARATUS

BACKGROUND OF THE INVENTION

1. Field of the Invention

The present invention relates to an optical scanning device and an image forming apparatus including the optical scanning device, such as a digital copier, a printer, a plotter, and a facsimile machine.

2. Description of the Related Art

Conventionally, there is known an optical scanning device for deflecting a light beam with a deflecting unit such as an optical deflector, imaging the deflected light beam as microscopic spot light onto a surface which is a target of the scanning operation (scan target surface), and scanning the scan target surface in a main scanning direction at a constant speed. This technology is applied as a latent image writing unit in an image forming apparatus such as a laser beam printer, a laser beam plotter, a facsimile machine, and a digital copier. This optical scanning device scans a scan target surface such as an image carrier by using an optical deflector to deflect/reflect a laser beam radiated from a laser light source. At the same time, the intensity of the laser beam is modulated in accordance with image signals (e.g., ON, OFF). Accordingly, an image is written onto the scan target surface.

A rotatable polygon mirror that rotates at a constant speed is widely used as an optical deflector. An fθ lens is generally used as the scanning lens for imaging the deflected light beam onto the scan target surface. With the use of the fθ lens, the scanning speed of the deflected light beam can be made substantially constant at the respective scanning positions on the scan target surface, and the beam spot diameters can be made substantially consistent.

However, with an optical scanning device using the polygon mirror and the fθ lens, there are cases where the scanning speed at the respective scanning positions on the scan target surface cannot be corrected so as to be constant over the entire effective writing region. This correction failure may occur when a thin scanning lens is used for the purpose of reducing cost. Moreover, the static beam spot diameters are generally substantially consistent at the respective scanning positions in an optical scanning device using the polygon mirror and the fθ lens. Thus, if the light source were modulated by the same light emitting pulse widths at the respective scanning positions, the respective scanning speeds would vary, and therefore the scanning lengths would be inconsistent. As a result, the scanning beam spot diameters would be inconsistent. If the photoconductor surface were exposed to scanning beam spots having different diameters at the respective scanning positions, the dot diameters would be inconsistent and the image would include regions having inconsistent densities. This leads to degraded image quality.

Meanwhile, there have been proposals of using a micro mirror as the optical deflector. A micro mirror has a resonance structure using the micromachining technique, and performs sine wave oscillation. When a rotatable polygon mirror is used, the apparatus needs to be increased in size and high-speed mechanical rotation is performed. Accordingly, problems arise such as banding caused by oscillation, increased temperature, noise, and increased power consumption. However, when a micro mirror is used as the deflecting unit of the optical scanning device, the apparatus can be reduced in size, and the above problems, such as banding caused by oscillation, increased temperature, noise, and increased power consumption, can be significantly mitigated. That is, by using a micro mirror that performs sine wave oscillation instead of a polygon mirror, noise and power consumption can be reduced, thus providing an image forming apparatus that is suited for the office environment. Such an image forming apparatus is also environmentally friendly because power consumption can be reduced.

However, if a micro mirror that performs sine wave oscillation were used as the deflecting unit, the deflection angle would change according to sine waves. Thus, when an fq lens used in current writing optical systems is applied to the scan-imaging optical system, the scanning speed decreases at the peripheral image heights. Accordingly, the scanning speed would be non-constant on the scan target surface. In this case also, the image quality would be degraded as described above.

To address this problem, patent document 1 discloses a technique of using a scan-imaging optical system (f·arcsin lens) having imaging properties (f·arcsin properties) as indicated by the following formula.

$$H = K \times \sin^{-1}(f/2f0)$$

(where H: image height, K: proportional constant, f: deflection angle, f0: amplitude)

Accordingly, such a technique provides an optical scanning device capable of optically correcting the waist position of a main scanning light beam, whereby the optical scanning device has a large effective writing width and performs the scanning at a constant scanning speed. However, by performing the above-described optical correction, there will be increased deviation among spot diameters of main scanning light beams at respective image heights on the scan target surface. This leads to degraded image quality.

As described above, in an optical scanning device using a micro mirror as the deflecting unit for performing sine wave oscillation, there is a trade-off relationship between having a constant scanning speed and the deviation among spot diameters of main scanning light beams at respective image heights on the scan target surface. There is yet to be proposed an optical scanning device which has favorable properties in both of these respects and which is capable of forming high-quality images.

Patent document 2 discloses an optical scanning device using a micro mirror as the deflecting unit for performing sine wave oscillation. Specifically, a consistent amount of light is emitted to the respective scanning positions by controlling the light emitting time of the light source, without using a scan-imaging optical system. However, if a scan-imaging optical system were not used, a considerably large curvature of image field would appear on the scan target surface. Accordingly, the diameter of the light beam cannot be reduced, and therefore high-resolution images cannot be formed. Furthermore, variations in optical properties would increase with respect to tolerance variations of optical elements, which would make it difficult to manufacture scanning devices with stable quality.

Patent Document 1: Japanese Laid-Open Patent Application No. 2005-215571

Patent Document 2: Japanese Laid-Open Patent Application No. 2007-292918

SUMMARY OF THE INVENTION

The present invention provides an optical scanning device and an image forming apparatus in which one or more of the above-described disadvantages are eliminated.

A preferred embodiment of the present invention provides an optical scanning device and an image forming apparatus including the same, capable of maintaining consistent scanning beam spot diameters in the main scanning direction throughout the respective scanning positions on the scan target surface, reducing the beam spot diameter, and forming high-resolution images.

According to an aspect of the present invention, there is provided an optical scanning device including a light source; a light source driving unit configured to modulate/drive the light source; a pulse width information holding unit configured to hold pulse width information items of predetermined pixels corresponding to scanning positions on a scan target surface; a deflecting unit including a reflection surface configured to deflect/scan a light beam from the light source; and a scan-imaging optical system configured to image the light beam deflected by the deflecting unit on the scan target surface, wherein the pulse width information holding unit holds the pulse width information items which cancel out deviations of main scanning beam spot diameters among the scanning positions on the scan target surface; and the light source driving unit drives the light source based on the pulse width information items held by the pulse width information holding unit.

According to one embodiment of the present invention, an optical scanning device and an image forming apparatus including the same are provided, which are capable of maintaining consistent scanning beam spot diameters in the main scanning direction throughout the respective scanning positions on the scan target surface, reducing the beam spot diameter, and forming high-resolution images.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

First Embodiment

Figure 1:
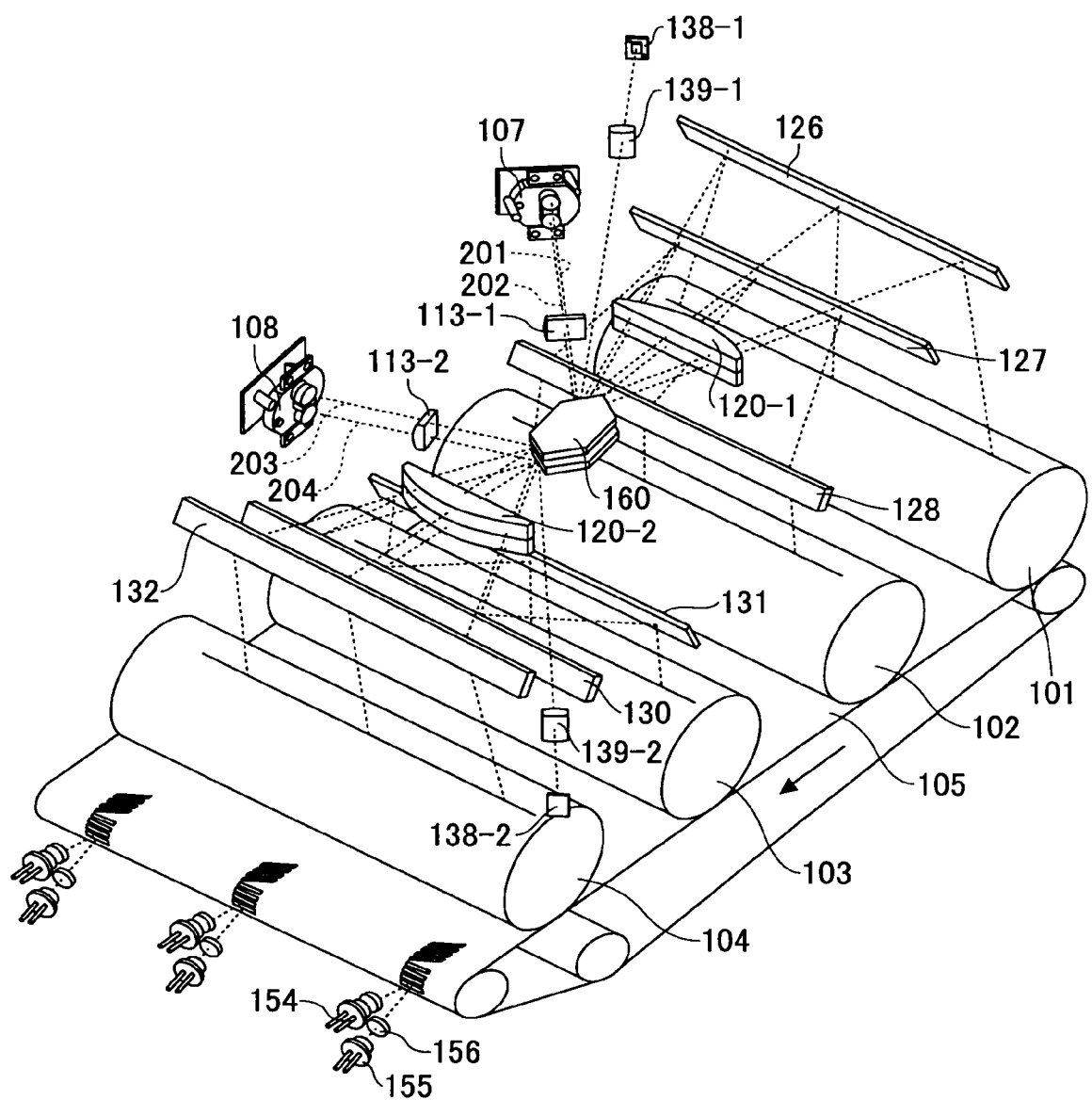
FIG. 1 is a perspective view of an optical scanning device according to a first embodiment of the present invention.

A description is given of an optical scanning device according to an embodiment of the present invention with reference to FIG. 1. In the optical scanning device shown in FIG. 1, a single polygon mirror is used to scan four stations.

The optical scanning device for scanning the respective photoconductive drums has an integrated configuration. Four photoconductive drums 101, 102, 103, and 104 are equally spaced apart along a moving direction of a transfer belt 105. Light beams radiated from light sources corresponding to the respective photoconductive drums 101 through 104 are deflected in the main scanning direction by a polygon mirror 160 functioning as a deflecting unit, and are then separated and guided to the respective photoconductive drums. As the four photoconductive drums 101 through 104 rotate in the sub scanning direction, two-dimensional images are formed.

The polygon mirror 160 has a two-stage structure. The respective light sources radiate light beams to the top stage and the bottom stage of the polygon mirror 160. Accordingly, the light beams from the respective light source units are deflected and scanned simultaneously. A single polygon mirror is used for scanning plural scanning regions, thus reducing cost.

In each light source unit 107, 108, light sources for two stations are arranged in the sub scanning direction. The light sources need not be included in light source units; each light source can be directly attached to the housing. Furthermore, for the purpose of increasing the speed, each light source can be a semiconductor laser array including two or more light emitting points. In this case, FIG. 1 only illustrates the light path of one representative light beam.

Figure 2:
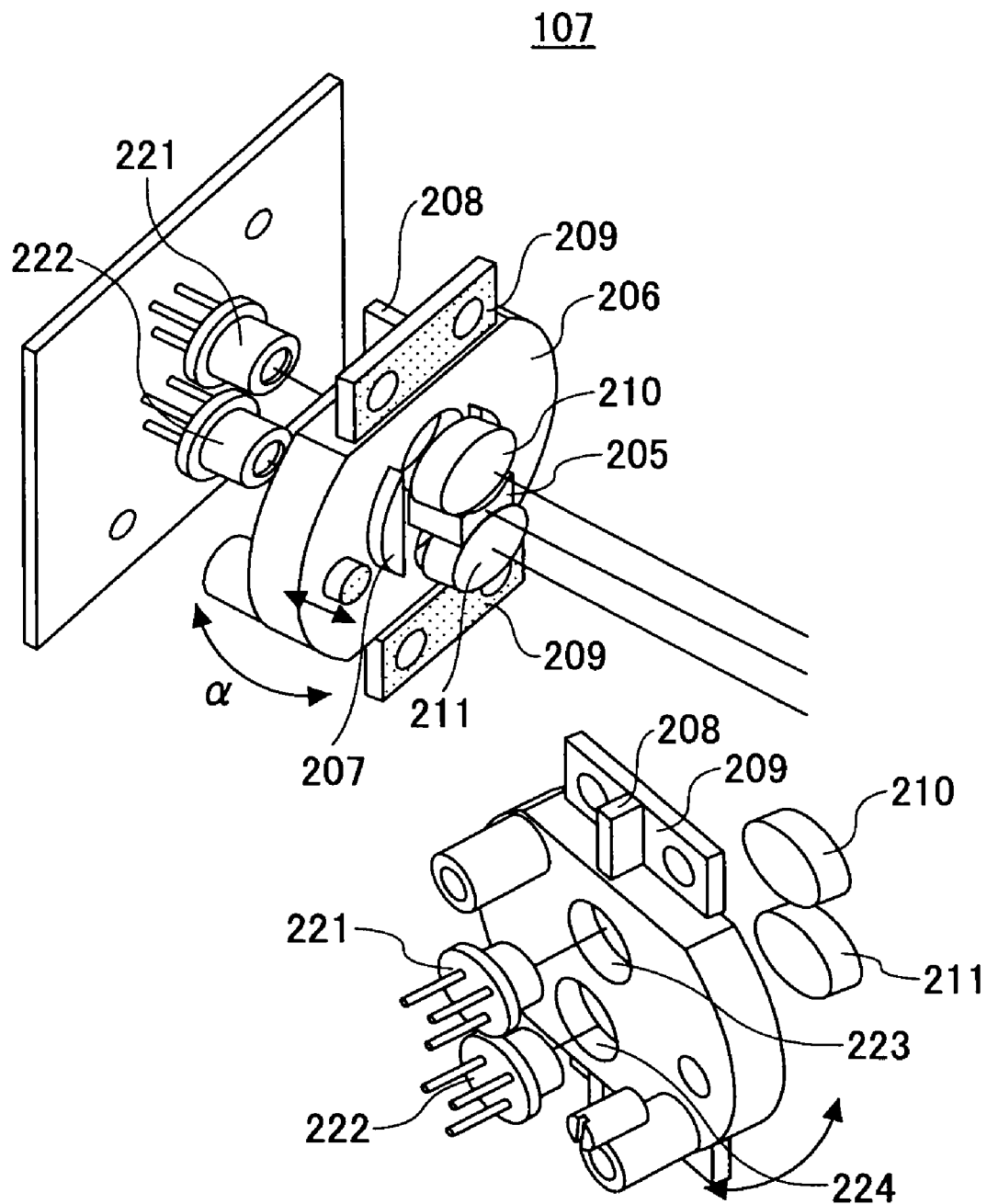
FIG. 2 illustrates a light source unit included in the optical scanning device according to the first embodiment of the present invention.

FIG. 2 is a perspective view of the light source unit 107.

Semiconductor laser diodes 221 and 222 serving as light sources are respectively inserted into and fixed to fitting holes 223 and 224 formed in a holder member 206. Before being fixed, the positions of the semiconductor laser diodes 221 and 222 in the rotational direction along a stem outer periphery are determined from behind the fitting holes 223 and 224, using the stem outer periphery as a reference.

Furthermore, a protruding part 205 having U-shaped grooves at the top and bottom is for positioning coupling lenses 210 and 211, such that the light axes of the coupling lenses 210 and 211 respectively correspond to the radiation axes of the semiconductor laser diodes 221 and 222. In addition, the protruding part 205 is also for positioning the light axes directions with respect to the light emitting points such that the radiated light beams become diverging light beams. A UV adhesive is filled into the gaps between the protruding part 205 and the coupling lenses 210 and 211, and then the UV adhesive is cured to fix these elements together. When each of the semiconductor laser diodes 221 and 222 has two or more light emitting points as described above, each of the semiconductor laser diodes 221 and 222 is positioned as follows. That is, an axis, which passes through the middle point of the light emitting points and which is parallel to the respective light axes, coincides with the light axis of the corresponding one of the coupling lenses 210 and 211.

Each light source unit is mounted onto a surface of the housing (housing mounting surface) which is orthogonal to a radiation axis C (not shown), by using a cylindrical protruding part 207 formed on the holder member 206 as a reference for determining the position. Specifically, top and bottom mounting bearing surfaces 209, which are interlocked via a support shaft 208, are integrated with the holder member 206. The mounting bearing surfaces 209 are placed against the housing mounting surface and fixed to the housing mounting surface with screws.

In the configuration shown in FIG. 1, the light beams radiated from the light source units 107 and 108 are converged in the sub scanning direction near the reflection surface of the polygon mirror 160 by cylinder lenses 113-1 and 113-2, respectively (hereinafter, collectively denoted by 113). After being deflected, the light beams are diverged and enter fθ lenses 120-1 and 120-2 (hereinafter, collectively denoted by 120). Each of the fθ lenses 120 has a top stage and a bottom stage. The light beams deflected at the top stage and the bottom stage of the polygon mirror 160 are imaged with predetermined beam spot diameters on the surfaces of the photoconductive drums 101, 102, 103, and 104.

Among the light beams from the light source units that have passed through the fθ lenses 120, a light beam 201 (denoted by the same reference numeral as the corresponding light source) which has been radiated from a light source 201 at the top stage of the light source unit 107 is reflected by a reflection mirror 126, imaged as a spot on the photoconductive drum 101, thereby forming a latent image based on black image information in the first image forming station.

A light beam 202 from the bottom stage of the light source unit 107 is reflected by reflection mirrors 127 and 128, imaged as a spot on the photoconductive drum 102, thereby forming a latent image based on cyan image information in the second image forming station.

A light beam 204 from the bottom stage of the light source unit 108 is reflected by reflection mirrors 130 and 131, imaged as a spot on the photoconductive drum 103, thereby forming a latent image based on magenta image information in the third image forming station.

A light beam 203 from the top stage of the light source unit 108 is reflected by a reflection mirror 132, imaged as a spot on the photoconductive drum 104, thereby forming a latent image based on yellow image information in the fourth image forming station.

A light beam that has been deflected at the polygon mirror 160 passes by the side of the scanning lens (fθ lens) 120, and is then focused by an imaging lens 139 (139-1, 139-2) to enter a synchronous detecting sensor 138 (138-1, 138-2). Based on a detection signal of the synchronous detecting sensor 138, synchronous detection signals for each of the stations are generated.

At the outlet roller part of the transfer belt 105, there is provided a detecting unit for detecting the superposition precision at which the respective color images formed at each of the stations have been superposed. The detecting unit reads the detection patterns of toner images formed on the transfer belt 105 to detect main scanning registration and sub scanning registration as displacement from the reference station, and correction control is periodically implemented.

In the present embodiment, the detecting unit includes an LED element 154 used for illumination, a photo sensor 155 for receiving reflection light, and a pair of condensing lenses 156. The detecting unit is provided at three positions corresponding to the left and right edges and at the middle portion of an image (on the transfer belt 105). As the transfer belt 105 moves, these detecting units detect the detection time differences of the colors with respect to black, which is the reference color.

The fθ lens 120 has a lens surface (incidence surface) 120a (not shown) which is the one closer to the polygon mirror 160 and a lens surface (radiation surface) 120b (not shown) which is the one further away from the polygon mirror 160. The length from the polygon mirror 160 to the lens surface (incidence surface) 120a of the fθ lens 120 is 31.52 mm, and the length from the lens surface (radiation surface) 120b of the fθ lens 120 to the surface of each of the photoconductive drums 101, 102, 103, and 104 is 176 mm.

Table 1 shows the design data of the incidence surface 120a and the radiation surface 120b, where "Rm" is the paraxial curvature radius of the fθ lens 120 in the main scanning direction, "Rs" is the paraxial curvature radius of the fθ lens 120 in the sub scanning direction, "D" is the thickness of the fθ lens 120, and "N" is the refraction index at a usage wavelength of 780 nm.

TABLE 1

| SURFACE | Rm | Rs | D | N |
|---------|--------|--------|-------|-------|
| 120a | 179 | 96.4 | 19.33 | 1.524 |
| 120b | −157.26 | −19.33 | | |

The shapes of the incidence surface 120a and the radiation surface 120b described above can be expressed by the following formula (1).

$$(Y, Z) = (1/Rm) \cdot Y2/\{1 + \sqrt{(1 - (1 + a0) \cdot (1/Rm)2 \cdot Y2)}\} + a4 \cdot Y4 + a6 \cdot Y6 + \ldots + Cs(Y) \cdot Z2/\{1 + \sqrt{(1 - Cs(Y)2 \cdot Z2)}\} + (f0 + f1 \cdot Y + f2 \cdot Y2 + \ldots) \cdot Z$$

$$(\text{where } Cs(Y) = 1/Rs + b2 \cdot Y2 + b4 \cdot Y4 + \ldots)$$

Formula (1)

The respective coefficients in the above formula (1) for each surface are as follows.
(Incidence Surface 120a)

$a_0 = -5.36E+01$ $a_4 = -1.38E-06$ $a_6 = -1.58E-09$ $a_8 = 3.66E-12$ $a_{10} = -8.31E-15$ $a_{12} = 1.13E-17$ $a_{14} = -5.98E-21$ where $E+01 = \times 10^{01}$, $E-07 = \times 10^{-07}$, which also applies in the following.
(Radiation Surface 120b)

$a_0 = 1.95E+00$ $a_4 = -9.04E-07$ $a_6 = -1.04E-09$ $a_8 = 1.33E-12$ $a_{10} = -3.01E-15$ $a_{12} = 3.40E-18$ $a_{14} = -1.39E-21$ $b_1 = -2.08E-05$ $b_2 = 1.68E-05$ $b_3 = -1.08E-08$ $b_4 = -1.02E-08$ $b_5 = 4.96E-12$ $b_6 = 9.77E-14$

Table 2 shows the ratios of the scanning speeds (hereinafter, "linearity") at the peripheral image heights (±108 mm) with respect to a reference scanning speed which is the scanning speed at the center image height (image height 0 mm) on the scan target surface.

TABLE 2

|  | IMAGE HEIGHT (mm) | | |
|---|---|---|---|
|  | −108 | 0 | 108 |
| LINEARITY (%) | −2.2 | 0 | −0.6 |

With respect to the pulse width at the image height 0 mm, the pulse width at the image height −108 mm is increased by 2.2%, and the pulse width at the image height +108 mm is increased by 0.6%. Accordingly, the scanning beam spot diameters can be made uniform, taking into consideration the scanning speeds at the respective image heights. Therefore, the dot positions in the valid writing region for forming images can be positioned with more stable precision in the exposing process, thus forming images with stable quality.

In the present embodiment, the scanning beam spot diameters are made uniform across the entire valid writing region, as described above. However, the scanning speeds vary at the respective image heights, and therefore the dot positions in the main scanning direction need to be adjusted. Accordingly, the dot positions in the main scanning direction are simultaneously corrected as described below.

Figure 3:
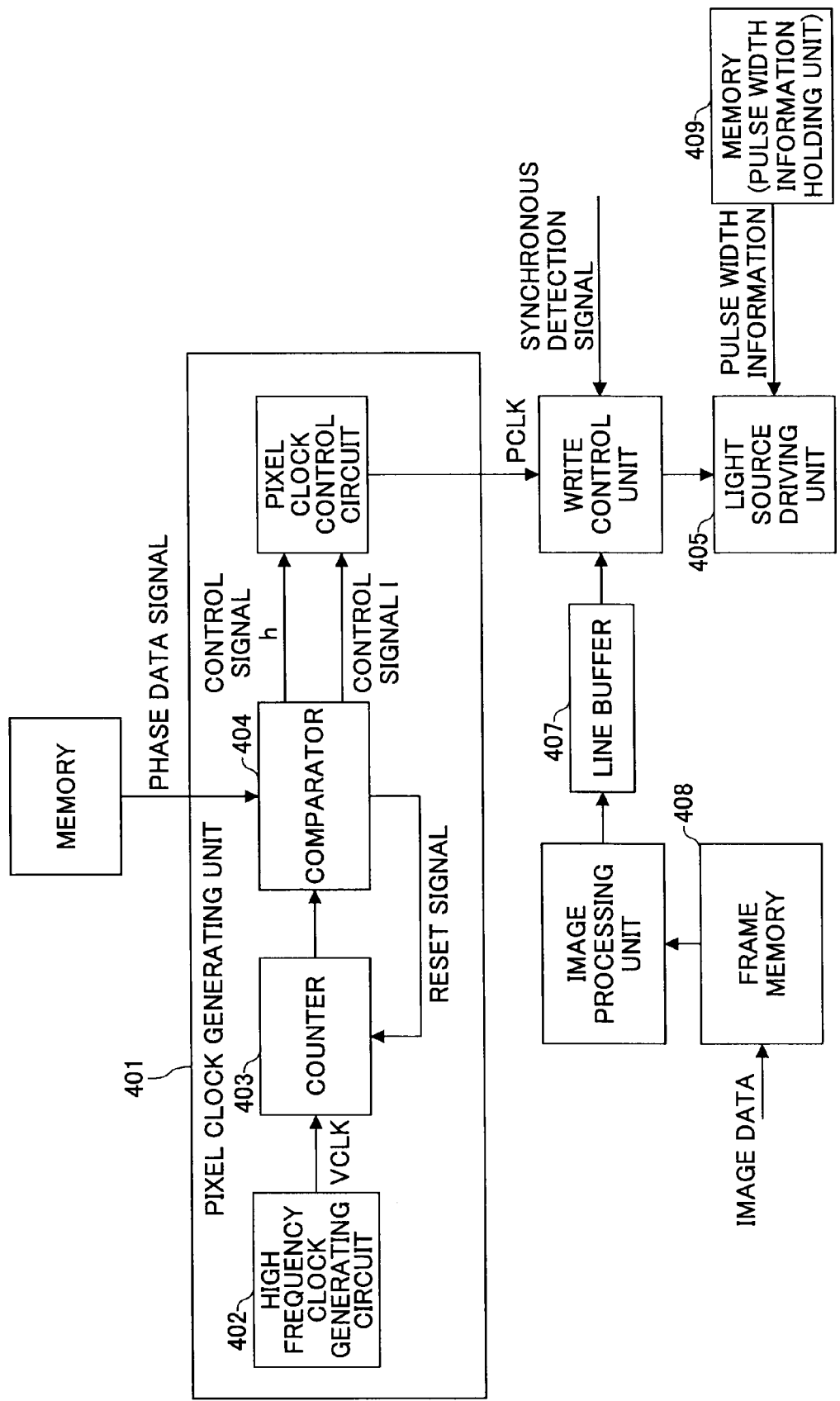
FIG. 3 is a block diagram of a driving circuit of a light source driving unit according to an embodiment of the present invention.

FIG. 3 is a block diagram of a driving circuit of the light source driving unit for modulating the semiconductor laser diode which is the light source.

The image data that is rasterized for each of the colors is temporarily held in a frame memory 408. The image data is sequentially read from the frame memory 408 by an image processing unit, and by referring to anteroposterior relationships, pixel data is formed for each line in accordance with a matrix pattern corresponding to a half tone. The pixel data is transferred to a line buffer 407 corresponding to each of the light sources. As synchronous detection signals are read from each line buffer 407 as triggers, a write control circuit is separately modulated. Furthermore, pulse width information of the respective image heights is read from a memory 409 (pulse width information holding unit) which stores pulse width information of the respective image heights, and drives the light source at the pulse width that has been read.

The light source driving unit preferably has a function of separately setting the timings of starting to light the light source for each of the pixels within a line.

Next, a description is given of a pixel clock generating unit 401 for modulating the light emitting points. A counter 403 counts a high frequency clock VCLK that has been generated at a high frequency clock generating circuit 402 (high frequency clock generating unit). A comparator 404 compares the following values: the counter value counted by the counter 403; a setting value L set beforehand based on the duty ratio; and phase data H for instructing the phase shift amount, whereby phase data H is received from outside as the transition timing of the pixel clock. The comparator 404 outputs a control signal 1 instructing the fall of a pixel clock PCLK when the counter value corresponds to the setting value L. The comparator 404 outputs a control signal h instructing the rise of the pixel clock PCLK when the counter value corresponds to the phase data H. The counter 403 is reset at the same time as when the control signal h is output and starts counting from zero once again. Accordingly, a continuous pulse row can be formed.

In this manner, phase data H is given for each clock to generate pixel clocks PCLK in which the pulse periods are sequentially changed. In the present embodiment, the pixel clock PCLK is divided into eight stages of the high frequency clock VCLK, so that the phases can be changed by a resolution of ⅛ clock.

Figure 4:
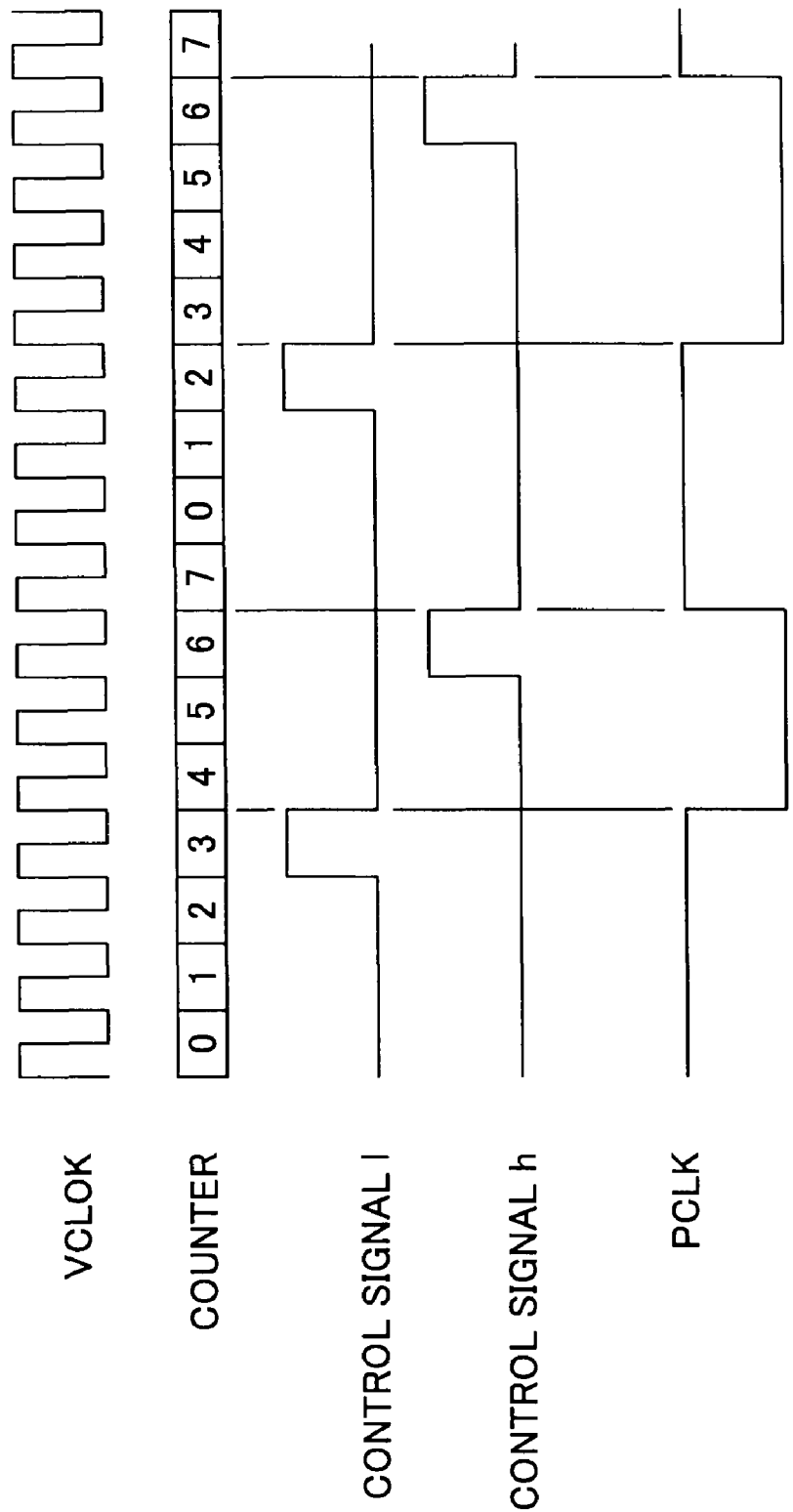
FIG. 4 illustrates an example of shifting the phases of arbitrary pixels.

FIG. 4 illustrates an example of shifting the phases of arbitrary pixels, where the phases are delayed by ⅛ clock.

Assuming that the duty is 50%, a setting value L=3 is given. Accordingly, when the counter 403 counts to four, the pixel clock PCLK falls. Assuming that the phase is delayed by ⅛ clock, phase data H=6 is given. Accordingly, when the counter 403 counts to seven, the pixel clock PCLK rises. At the same time, the counter is reset, so that the pixel clock PCLK falls once again at four counts. This means that adjacent pulse periods have been reduced by ⅛ clock.

The pixel clock PCLK thus generated is transmitted to a light source driving unit 405. Modulation data is created by superposing pixel data items that are read from the line buffer 407 for this pixel clock PCLK. The modulation data is used to drive the semiconductor laser diodes.

Figure 5:
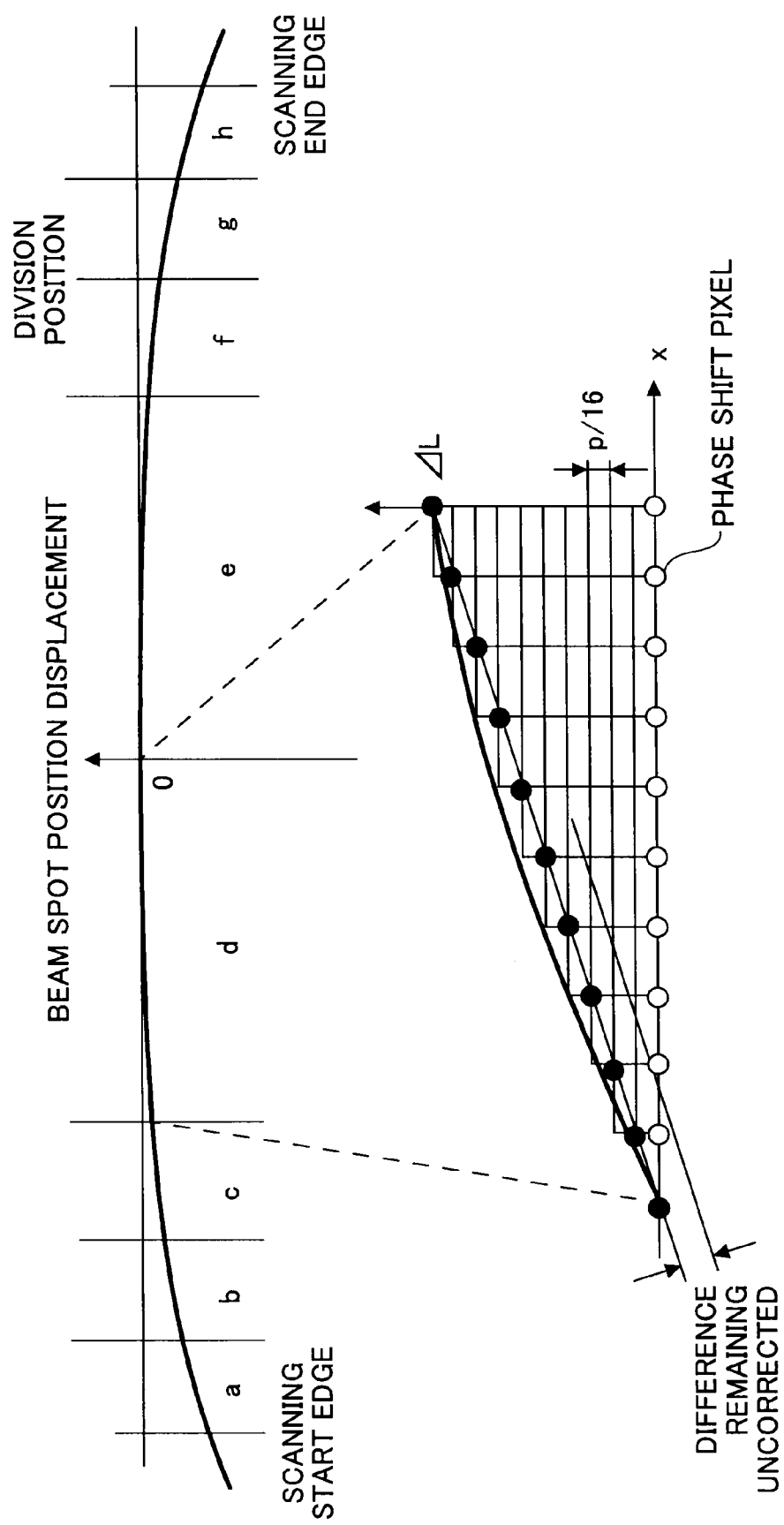
FIG. 5 illustrates the correction amounts of the positions where light beams reach for the respective pixels according to the main scanning direction when modulation is performed with a single frequency.

FIG. 5 illustrates the correction amounts of the positions where light beams reach (reach positions) for the respective pixels according to the main scanning direction when modulation is performed with a single frequency. The main scanning region is divided into plural (eight in the present embodiment) segments (regions). The number of times to shift the phase (phase shift number) for each region is set and the positions are corrected in a stepwise manner, so that the main scanning positional displacement is zero at the boundaries of the regions when the regions are subjected to piecewise linear approximation.

For example, the following equation is satisfied, where the number of pixels in a region "i" is "Ni", the shift amount of each pixel is expressed in units of 1/16 of the pixel pitch, and the displacement at the main scanning reach positions at both ends of each region is expressed as ΔLi.

$$Ni = Ni/p/16\Delta Li$$

Accordingly, the phase is to be shifted for every ni pixels.

Assuming that the pixel clock is fc, the total phase difference Δt is expressed as follows with the use of the phase shift number Ni/ni.

$$\Delta t = 1/16 fc \times \int (Ni/ni) di$$

Similarly, the phase difference Δt at the pixel of the Nth dot can be set with the use of the accumulated phase shift number up to that point.

The scanning widths (region widths) of the regions obtained by dividing the main scanning region can be equal or unequal. Furthermore, the main scanning region can be divided into any number of regions. However, when the shift amount of each pixel increases, the difference among the regions becomes noticeable. Therefore, the shift amount is preferably lower than or equal to units of ¼ of a pixel pitch p. Conversely, when the phase shift amount decreases, the number of phase shifts increases, which leads to an increase in the amount of memory. Furthermore, the smaller the number of segments obtained by the division, the smaller the amount of memory. Accordingly, it is efficient to decrease the width of a region in which the main scanning reach position displacement is large, and to increase the width of a region in which the main scanning reach position displacement is small.

Output of the semiconductor laser diode is generally detected by a sensor of a light amount monitor having a backlight mounted inside the same package, for each scanning operation before the output enters the image region. While recording one line, the amount of electrical current applied to the light source is controlled in such a manner that a constant value is maintained.

Second Embodiment

Figure 6:
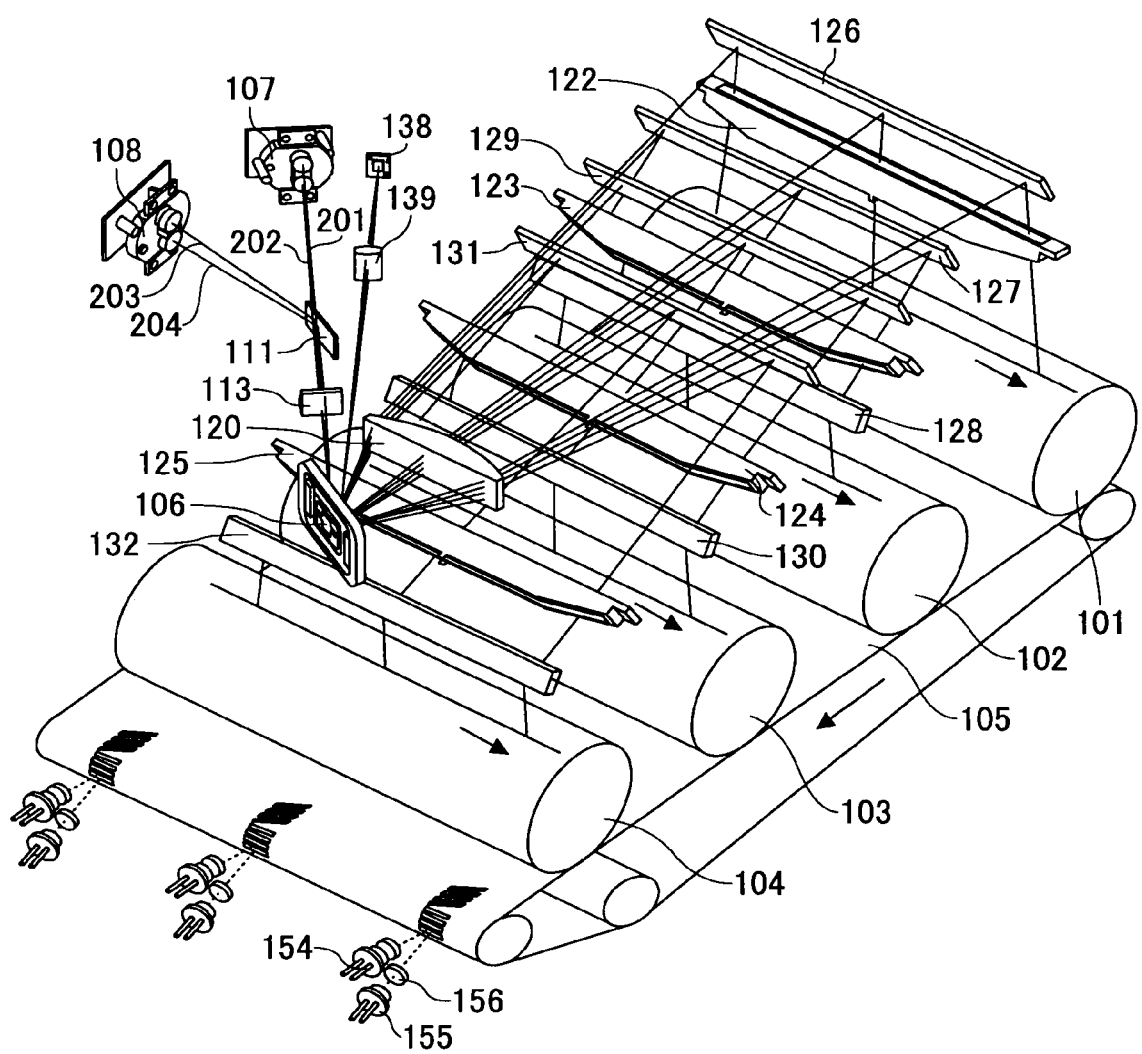
FIG. 6 is a perspective view of an optical scanning device according to a second embodiment of the present invention.

A description is given of an optical scanning device according to a second embodiment of the present invention. FIG. 6 illustrates the optical scanning device according to the second embodiment of the present invention. In the optical scanning device shown in FIG. 6, a single oscillating mirror is used to scan four stations.

In FIG. 6, elements corresponding to those in FIG. 1 are denoted by the same reference numbers.

In the present embodiment, the light beams from the respective light source units are obliquely incident on an oscillating mirror 106 serving as a deflecting unit at different incidence angles in the sub scanning direction. Accordingly, the light beams from the respective light source units are collectively deflected and scanned. A single oscillating mirror is used to scan plural scanning regions, and therefore costs can be reduced. Moreover, there is no need to make adjustments for matching the resonance frequency, the driving frequency, the amplitude, and the deflection angle, which adjustments would be indispensable in a case where plural oscillating mirrors are used. Accordingly, the manufacturing procedures can be reduced and optical performance can be improved.

In each light source unit 107, 108, light sources for two stations are arranged in the sub scanning direction. The light source units 107 and 108 are adjusted such that the light beams from their light sources have an angle of 2.4°. Moreover, the light source units 107 and 108 are integrally supported such that the light beams from their light sources intersect in the sub scanning direction at the surface of the oscillating mirror 106. Furthermore, each light source has two light emitting points. However, FIG. 6 only illustrates the light path of one representative light beam.

Figure 7:
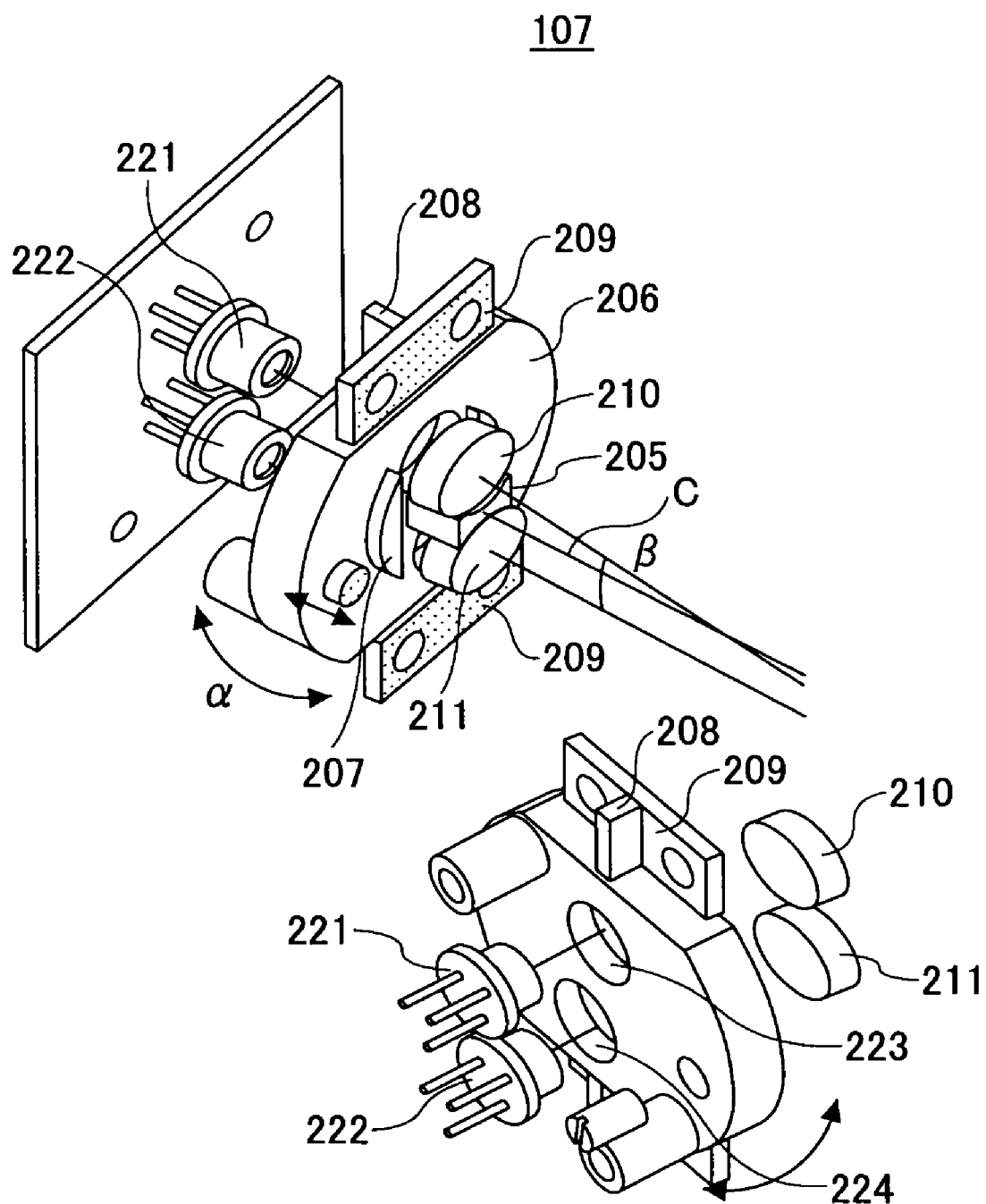
FIG. 7 illustrates a light source unit included in the optical scanning device according to the second embodiment of the present invention.

In the present embodiment, as shown in FIG. 7, the light source unit 107 is configured such that: a light beam from the bottom light source is tilted upward by 1.5° with respect to a radiation axis C of the light source unit 107; a light beam from the top light source is tilted downward by 3.3° with respect to the radiation axis C of the light source unit 107; and the radiation axis C is tilted downward by 0.9° with respect to a main scanning plane. Meanwhile, the light source unit 108 is configured such that: a light beam from the top light source is tilted downward by 1.5° with respect to the radiation axis C of the light source unit 108; a light beam from the bottom light source is tilted upward by 3.3° with respect to the radiation axis C of the light source unit 107; and the radiation axis C is tilted upward by 0.9° with respect to a main scanning plane. In this manner, the light source units 107 and 108 are positioned at different heights in the sub scanning direction such that the radiation axes C of the light source units 107 and 108 intersect in the sub scanning direction at the surface of the oscillating mirror 106. When each of the semiconductor laser diodes 221 and 222 has two or more light emitting points, an axis passing through the middle point of the light emitting points and parallel to the respective light axes is set as described above.

Figure 8:
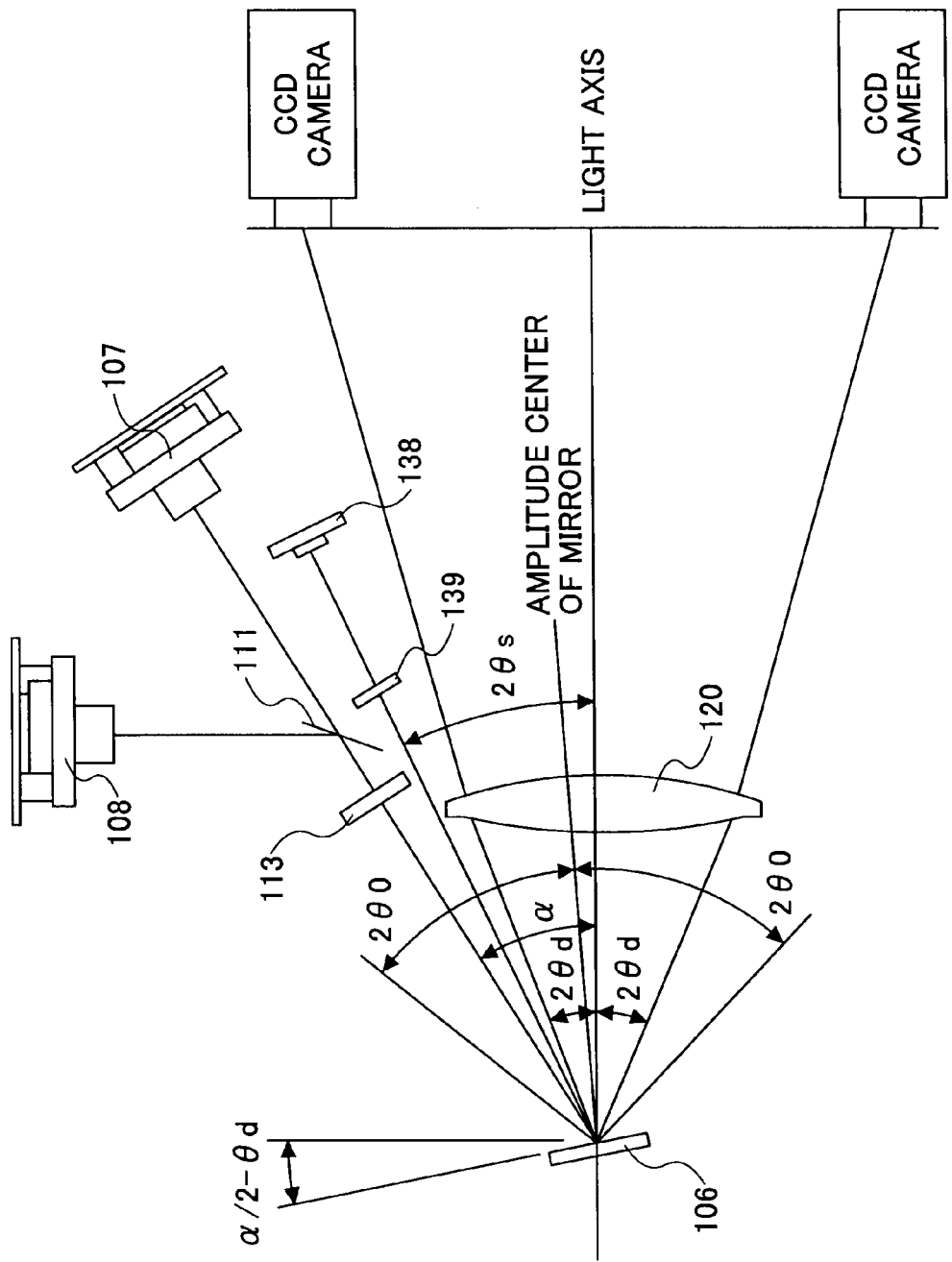
FIG. 8 illustrates an example of the optical scanning device according to the second embodiment of the present invention in which the incidence angle is α, and the amplitude center does not correspond to an optical axis of a scanning lens.

As shown in FIG. 8, the light source unit 108 is positioned so as to be lower than the light source unit 107 in the sub scanning direction. An incidence mirror 111 causes the light beams 201, 202, 203, and 204 from the respective light sources to enter the cylinder lens 113 at different heights in the sub scanning direction in such a manner as to be vertically aligned. Furthermore, the light beams 201, 202, 203, and 204 intersect each other in the sub scanning direction on the oscillating mirror 106 in such a manner that their respective incidence angles are 22.5° ($=\alpha/2+\theta d$) in the main scanning direction with respect to the normal line of the oscillating mirror 106.

The light beams are converged by the cylinder lens 113 in the sub scanning direction near the surface of oscillating mirror 106. After being deflected, the light beams are gradually spaced apart so as to be separated from each other, and the light beams enter the first scanning lens (fθ lens) 120.

The reflection surface of the oscillating mirror 106 is a metal film. As described below in detail, in the present embodiment, in order to maintain equal scanning beam spot diameters in the main scanning direction at the respective scanning positions, the light emitting intensity at the peripheral parts of the scanning width of the scan target surface needs to be relatively strong compared to the middle part of the scanning width of the scan target surface (i.e., the light amounts at the peripheral image heights need to be relatively large). Generally, if the mirror is made of a metal film, the reflectance ratio in accordance with the incidence angles would not change as much compared to the case where the mirror is made of a dielectric multilayer. Thus, it is possible to prevent the reflectance ratio from degrading when the light beams are radiated to the oscillating mirror 106 at the most obtuse angle when scanning the peripheral image heights on the opposite side of the light sources, thereby improving the light use efficiency. In the present embodiment, gold is used on the reflection surface, thereby reducing changes in the reflectance ratio according to the incidence angles at the oscillating mirror 106.

In the present embodiment, the incidence angle is $\alpha$ as illustrated in FIG. 8, and therefore the incidence angle on the oscillating mirror 106 is obtuse. Accordingly, a metal film is preferably used to minimize changes in the reflectance ratio.

The effective diameter of the reflection surface of the oscillating mirror 106 is larger than any of the diameters of the light beams (incidence light beams) 201 through 204. Accordingly, vignetting of the light beams on the oscillating mirror 106 can be prevented. In a case of an overfilled type optical system in which the light beam is vignetted on the oscillating mirror 106 to determine the aperture, when the incidence angle is most obtuse, the observable aperture diameter is minimized. Consequently, the light use efficiency is decreased when scanning the peripheral image heights on the opposite side of the light sources. For this reason, the light amount needs to be increased when scanning the peripheral image heights on the opposite side of the light sources. In the present embodiment, it is necessary to increase the light amounts at the peripheral image heights, and therefore the effective diameter of the oscillating mirror 106 is determined so as to prevent vignetting of the light beams on the oscillating mirror 106.

The first scanning lens (fθ lens) 120 is used for all stations, and does not have a function of converging the light beams in the sub scanning direction. Second scanning lenses 122 through 125 have functions of converging the light beams mainly in the sub scanning direction. The second scanning lenses 122 through 125 only have primary components (tilt components) in the sub scanning direction on their radiation surfaces, and have functions for preventing the scanning lines from bending, which is characteristic of optical systems with oblique incidence light beams. Details of the scanning lenses are described below.

Among the light beams from the light source units that have passed through the first scanning lens (fθ lens) 120, the light beam 204 from the bottom stage of the light source unit 108 is reflected from the reflection mirror 126, passes through the second scanning lens 122, and is then imaged as a spot on the photoconductive drum 101. Accordingly, the light beam 204 forms a latent image based on black image information in the first image forming station.

The light beam 203 from the top stage of the light source unit 108 is reflected from the reflection mirror 127, passes through the second scanning lens 123, reflected from the reflection mirror 128, and is then imaged as a spot on the photoconductive drum 102. Accordingly, the light beam 203 forms a latent image based on cyan image information in the second image forming station.

The light beam 201 from the top stage of the light source unit 107 is reflected from a reflection mirror 129, passes through the second scanning lens 124, reflected from the reflection mirror 130, and is then imaged as a spot on the photoconductive drum 103. Accordingly, the light beam 201 forms a latent image based on magenta image information in the third image forming station.

The light beam 202 from the bottom stage of the light source unit 107 is reflected from the reflection mirror 131, passes through the second scanning lens 125, reflected from the reflection mirror 132, and is then imaged as a spot on the photoconductive drum 104. Accordingly, the light beam 202 forms a latent image based on yellow image information in the fourth image forming station.

As for the synchronous detecting sensor, similar to the first embodiment, a light beam that has been deflected at the oscillating mirror 106 passes by the side of the first scanning lens (fθ lens) 120, and is then focused by the imaging lens 139 to enter the synchronous detecting sensor 138. Based on a detection signal of the synchronous detecting sensor 138, synchronous detection signals for each of the stations are generated.

In the present embodiment, in order to keep the effective scanning ratio (θd/θ0) at less than or equal to a predetermined value of 0.6, as shown in FIG. 8, an average incidence angle α of the light beams from the light sources is set so as to satisfy the following relationship.

$$\theta 0 \geq \alpha/2 > \theta d$$

$$\theta 0 \geq \theta s > \theta d$$

(where θd is the effective deflection angle for scanning the photoconductor, and θs is the deflection angle when synchronous detection is performed)

By setting the average incidence angle α as above, the oblique incidence angle can be reduced, so that degradation of optical properties can be minimized. For example, in a front incidence optical system, the oblique incidence angle needs to be increased to avoid interference of optical elements in the sub scanning direction, which leads to degradation in optical properties.

The effective scanning ratio is set to be less than or equal to 0.6 in order to perform the scanning operation with deflection angles within a range for achieving constant scanning speed.

Specifically, the angles are set at θ0=25°, θd=15°, α=45°, and θs=18°.

Furthermore, the synchronous detecting sensor 138 can be disposed so as to satisfy θs>α/2.

FIG. 8 illustrates an example where the amplitude center does not correspond to the optical axis of the scanning lens, i.e., the oscillating mirror is oscillated with its amplitude center displaced toward the light sources. However, in the present embodiment, the oscillating mirror is arranged so that its amplitude center corresponds to the optical axis of the scanning lens. The shape of the scanning lens or the second scanning lens is symmetrically curved along the main scanning direction.

The first scanning lens (fθ lens) 120 includes the lens surface (incidence surface) 120a which is closer to the oscillating mirror 106 and the lens surface (radiation surface) 120b which is further away from the oscillating mirror 106. The length from the oscillating mirror 106 to the lens surface (incidence surface) 120a of the first scanning lens (fθ lens) 120 is 28 mm, and the length from the lens surface (radiation surface) 120b of the first scanning lens (fθ lens) 120 to each of incidence surfaces 122a, 123a, 124a, and 125a (not shown) of the second scanning lenses 122, 123, 124, and 125, respectively, is 128 mm. The length from each of radiation surfaces 122b, 123b, 124b, and 125b (not shown) of the second scanning lenses 122, 123, 124, and 125, respectively, to the corresponding one of the photoconductive drums 101, 102, 103, and 104 is 79.5 mm.

The design data of the respective surfaces are shown in Table 3, where Rm is the paraxial curvature radius in the main scanning direction, Rs is the paraxial curvature radius in the sub scanning direction, D is the thickness of the scan imaging lens, and N is the refractive index at a usage wavelength of 780 nm. The stations share second scanning lenses and the lenses are the same; therefore the data of the second scanning lens 122 is indicated as a representative example.

TABLE 3

| SURFACE | Rm | Rs | D | N |
|---------|-----------|-------|---|-------|
| 120a | −151.79 | ∞ | 5 | 1.524 |
| 120b | −63.52 | ∞ | | |
| 122a | −1606.03 | 28.29 | 3 | |
| 122b | −1614.57 | ∞ | | |

The respective coefficients in the above formula (1) for each surface are as follows.
(Incidence Surface 120a)

$$a4 = -3.09E - 06$$

$$a6 = 1.49E - 09$$

$$a8 = 1.11E - 11$$

$$a10 = -2.51E - 14$$

$$a12 = 1.48E - 17$$

(Radiation Surface 120b)

$a4=-2.50E-06$ $a6=1.63E-09$ $a8=-2.88E-12$ $a10=1.41E-14$ $a12=-1.94E-17$ $b2=2.23E-05$ $b4=1.20E-09$ (Incidence Surface 122a)

$a4=-7.61E-07$ $a6=2.64E-10$ $a8=-3.69E-14$ $a10=1.60E-18$ $a12=1.71E-23$ $b2=-1.12E-06$ $b4=4.49E-10$ $b6=-2.59E-13$ $b8=6.10E-17$ $b10=-6.15E-21$ $b12=2.41E-25$ (Radiation Surface 122b)

$a4=-6.91E-07$ $a6=2.25E-10$ $a8=-2.56E-14$ $a10=1.94E-19$ $a12=8.45E-23$ $f2=-5.80E-08$ $f4=-1.43E-11$

As for the lenses of the two stations corresponding to different oblique incidence angles, the first scanning lens (fθ lens) 120 is shared, and the second scanning lenses 122 through 125 are the same. Therefore, the optical properties differ according to the respective oblique incidence angles. Generally, in a station having a relatively large oblique incidence angle, the optical properties degrade more considerably in consideration of tolerance variation. Therefore, the design median values are set such that the station having a relatively large oblique incidence angle has superior properties.

Accordingly, the respective optical properties of the design median values described below indicate those of the station having a relatively small oblique incidence angle with inferior properties.

In the present embodiment, the linearity of the peripheral image heights with respect to the center image height is designed so as to form a symmetrical shape of 0.04% at both edges. With such a configuration, the amplitude center of the oscillating mirror substantially corresponds to the center of the effective writing region, thereby minimizing inconsistencies in the linearity and the beam spot diameters.

Figure 9:
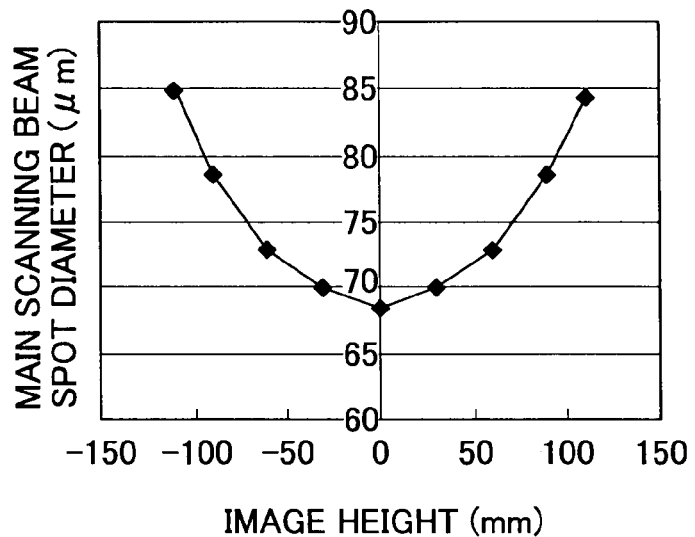
FIG. 9 is a graph plotting the static beam spot diameters at the respective image heights according to the second embodiment of the present invention.

The scanning lenses 120, 122, 123, 124, and 125 set the static beam spot diameters at the respective image heights in the main scanning direction as shown in table 4, assuming that the oscillating mirror 106 serving as the deflecting unit is stopped at the corresponding image height. Furthermore, FIG. 9 is a graph plotting the static beam spot diameters at the respective image heights at the same time. As shown in Table 4 and FIG. 9, the static beam spot diameters are set to form a symmetrical shape, in which the center image height (image height 0 mm) of the effective writing region has the minimum static beam spot diameter, and the image heights at both edges of the effective writing region have substantially the same static beam spot diameters.

TABLE 4

|  | IMAGE HEIGHT (mm) | | |
| --- | --- | --- | --- |
|  | −110 | 0 | 110 |
| MAIN SCANNING STATIC BEAM SPOT DIAMETER (μm) | 84.9 | 68.5 | 84.4 |

In an optical scanning device including an oscillating mirror that performs sine oscillation, assuming that a scan imagining optical system that scans a scan target surface at a constant speed is used, it is inevitable that there is deviation in main scanning beam spot diameters at the respective image heights.

Figure 10:
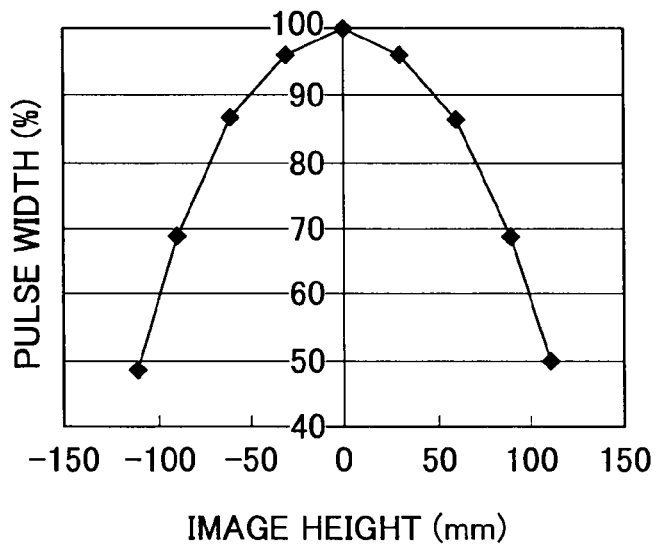
FIG. 10 is a graph indicating the pulse widths and the light amounts at the respective image heights when the center image height is 1.

In the present embodiment, this deviation is taken into consideration, and the light source is driven in such a manner as to change the pulse width rendering one dot for each image height. Table 5 and FIG. 10 show the pulse widths and the light amounts at the respective image heights when the center image height is 1.

TABLE 5

| IMAGE HEIGHT (mm) | PULSE WIDTH (%) | LIGHT AMOUNT (%) |
| --- | --- | --- |
| 110 | 50 | 200 |
| 90 | 69 | 145 |
| 60 | 86 | 116 |
| 30 | 96 | 104 |
| 0 | 100 | 100 |
| −30 | 96 | 104 |
| −60 | 86 | 116 |
| −90 | 69 | 145 |
| −110 | 48 | 208 |

As the image height becomes closer to the periphery, the pulse width is reduced. In order to prevent degraded image quality such as inconsistent densities among the image heights, the integral light amount for forming one dot is adjusted to be consistent among the different image heights.

In the present embodiment, the scan target surface is divided into eight segments as shown in table 5 and FIG. 10. For the segments ranging between ±90 mm through ±110 mm where the difference in the pulse width is acute, the intervals are reduced to 20 mm. Thus, the scanning beam spot diameters can be corrected more precisely compared to a case where all of the segments have the same intervals.

Furthermore, in order to achieve finer resolution for setting pulse widths, a larger memory is needed for holding such information. Thus, it may be advantageous to reduce the resolution, as long as the image is unaffected. For example, if the pulse widths at the respective image heights were set as shown in table 6 with reference to table 5, the memory would only have to hold eight information segments (3 bits), although more differences would remain uncorrected.

The scan target surface is divided into plural segments in the main scanning direction. The pulse width information within each one of the segments is preferably consistent. Furthermore, the plural segments are preferably determined by symmetrically dividing the scan target surface with the center portion of the scan target surface in the main scanning direction located in the middle. Furthermore, among the plural segments, at least one segment has a different scanning width from that of the other segments.

TABLE 6

| IMAGE HEIGHT (mm) | PULSE WIDTH (%) | LIGHT AMOUNT (%) |
| --- | --- | --- |
| 110 | 50 (4/8) | 200 |
| 90 | 75 (6/8) | 133 |
| 60 | 87.5 (7/8) | 114 |
| 30 | 100 (8/8) | 100 |
| 0 | 100 (8/8) | 100 |
| −30 | 100 (8/8) | 100 |
| −60 | 87.5 (7/8) | 114 |
| −90 | 75 (6/8) | 133 |
| −110 | 50 (4/8) | 200 |

Table 7 shows the scanning beam spot diameters at the respective image heights in the present embodiment when scanning one dot of 600 dpi (42.3 μm). The deviation among image heights amounts to 24% in the case of the static beam spot diameters in table 4, whereas in the example shown in table 7, the deviation is reduced to 4%. By equalizing the scanning beam spot diameters in consideration of the scanning speeds at the respective image heights, favorable images can be formed.

TABLE 7

| | IMAGE HEIGHT (mm) | | |
| --- | --- | --- | --- |
| | −108 | 0 | 108 |
| MAIN SCANNING BEAM SPOT DIAMETER (μm) | 90.7 | 87.2 | 90.2 |

In the present embodiment, the scanning beam spot diameters are maintained at equal sizes by increasing the light amount at the peripheral image heights compared to that at the center image height as shown in table 5 or 6. As described above, the reflection surface of the oscillating mirror 106 has a metal film made of a material such as gold, so that the reflectance ratio is less dependent on the incidence angle. Furthermore, the reflection surface effective diameter is determined so as to prevent vignetting of the light beams on the oscillating mirror 106. In optical scanning devices, the light sources need to have high output power to meet demands for high speed. In the present embodiment, the necessary light amount at the peripheral image heights corresponds to the rate-limiting amount. With this configuration, an optical scanning device which can meet the demands for high speed can be realized.

In optical elements, the reflectance ratio is inevitably dependent on incidence angles. Therefore, when a light beam passes through optical elements, the light amounts at the respective image heights are expected to become inconsistent. When the incidence angle is perpendicular, the reflectance ratio is high. As the incidence angle becomes tilted from the perpendicular angle, the reflectance ratio tends to decrease. Consequently, in most cases the light use efficiency at the peripheral image heights declines.

The example shown in FIG. 6 has a simple layout, with only one reflection mirror 126 being provided for guiding the light beam in the light path of the optical system for imaging the light beam on the photoconductive drum 101. Therefore, in the optical scanning device, the photoconductive drum 101 is to be used for forming images with a black color material which has the lowest brightness and the highest visibility, so that the degradation of image quality is unnoticeable.

In the optical scanning device according to an embodiment of the present invention, plural reflection mirrors are provided for plural scan target surfaces. The number of reflection mirrors for guiding the light beam to at least one scan target surface is preferably different from that for the other scan target surfaces. As described above, the least number of reflection mirrors is to be applied for guiding a light beam for the scan target surface which is used for forming images with the color material having the lowest brightness and the highest visibility, among the scan target surface.

Third Embodiment

By reducing the number of optical elements, it is possible to mitigate the inconsistencies in the light amounts among the different image heights (in most cases, light use efficiency is lower at peripheral image heights). Therefore, dust prevention glass, which is generally provided for sealing the optical scanning device, is preferably configured to serve also as a scanning lens.

Figure 11A:
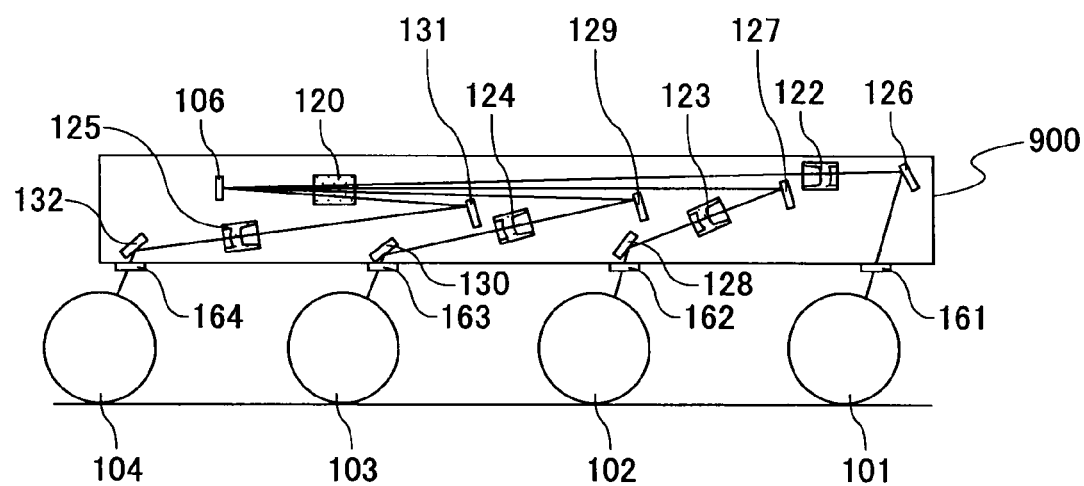
FIG. 11A is a cross-sectional view of an optical scanning device according to the conventional technology.
Figure 11B:
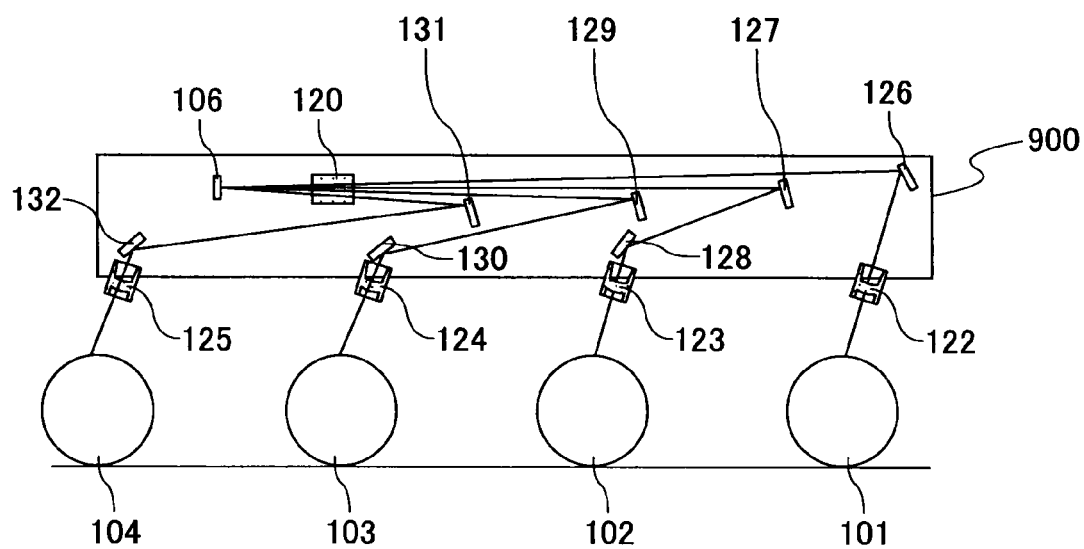
FIG. 11B is a cross-sectional view of an optical scanning device according to a third embodiment of the present invention.

FIG. 11A is a cross-sectional view of an optical scanning device according to the conventional technology, and FIG. 11B is a cross-sectional view of an optical scanning device according to a third embodiment of the present invention. FIG. 11A illustrates an example of sealing an optical scanning device 900 described in the above embodiments with dust prevention glass elements 161 through 164 through which the respective light beams pass on the way to the photoconductive drums 101 through 104, as in the conventional technology. FIG. 11B illustrates an example of sealing the optical scanning device 900 with the scanning lenses (individual scanning lenses) 122 through 125.

In the example shown in FIG. 11B, the optical elements also serve as dust prevention glass, which is different from the example shown in FIG. 11A. Therefore, the deviation of the light use efficiency of the respective image heights can be reduced, thereby realizing an optical scanning device that can meet demands for even higher speed.

Fourth Embodiment

Figure 12:
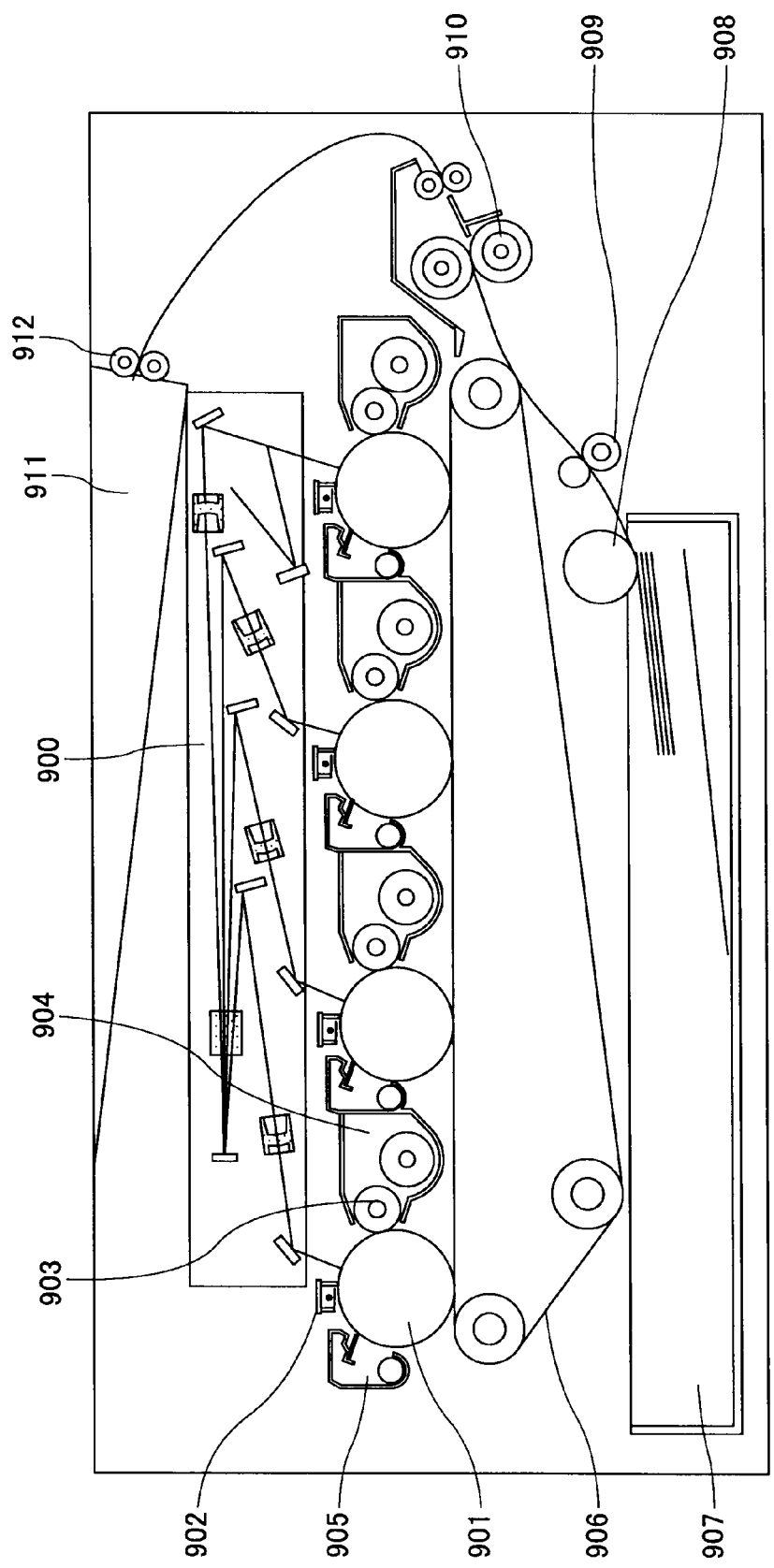
FIG. 12 is a cross-sectional view of an image forming apparatus according to an embodiment of the present invention.

FIG. 12 illustrates an example of an image forming apparatus including the above-described optical scanning device.

Around each photoconductive drum 901, there is provided a charger 902 for charging the photoconductive drum 901 to high voltage, a developing roller 903 for causing charged toner to adhere to an electrostatic latent image recorded by the optical scanning device 900 to form a visible image, a toner cartridge 904 for supplying toner to the developing roller 903, and a cleaning case 905 for storing residual toner which has been scraped off from the photoconductive drum 901. The oscillating mirror performs reciprocal scanning operations so that two lines of an image are recorded on the photoconductive drum 901 by one cycle.

Plural of the above-described image forming stations are aligned in the direction in which a transfer belt 906 moves. The respective toner images of yellow, magenta, cyan, and black are sequentially transferred onto the transfer belt 906 at adjusted timings so as to be superposed on one another, thereby forming a color image. The image forming stations basically have the same configuration, except that different colors of toner are used.

Meanwhile, a recording sheet is extracted from a sheet feeding tray 907 by a sheet feeding roller 908. Then, the recording sheet is sent out by a pair of resist rollers 909 at the timing when recording starts in the sub scanning direction. Accordingly, a toner image is transferred onto the recording sheet from the transfer belt 906. Subsequently, the toner is fixed onto the recording sheet by a fixing roller 910. Then, the recording sheet is ejected to a sheet eject tray 911 by a sheet eject roller 912.

The image forming apparatus shown in FIG. 12 employs the full-color tandem method; however, the optical scanning device according to an embodiment of the present invention is also applicable as a light writing unit of a monochrome machine.

By using the above optical scanning device in an image forming apparatus, it is possible to provide an image forming apparatus in which the scanning beam spot diameters are consistent throughout the entire effective writing region, and favorable images can be formed.

[1] According to an aspect of the present invention, there is provided an optical scanning device (FIGS. 1, 6, and 11B) including a light source (semiconductor laser diodes 221 and 222); a light source driving unit (FIG. 3) configured to modulate/drive the light source; a pulse width information holding unit (memory 409) configured to hold pulse width information items of predetermined pixels corresponding to scanning positions on a scan target surface (photoconductive drums 101 through 104); a deflecting unit (polygon mirror 160, oscillating mirror 106) including a reflection surface configured to deflect/scan a light beam (light beams 201 through 204) from the light source; and a scan-imaging optical system configured to image the light beam deflected by the deflecting unit on the scan target surface, wherein the pulse width information items held by the pulse width information holding unit cancel out deviations of main scanning beam spot diameters among the scanning positions on the scan target surface; and the light source driving unit drives the light source based on the pulse width information items held by the pulse width information holding unit.

Conventionally, in an optical scanning device, when dots are formed with uniform light emitting time lengths over the entire effective writing region, there may be deviations among the scanning beam spot diameters, which leads to degraded image quality.

In the optical scanning device described in [1], the light emitting time lengths of the light source are set in such a manner as to cancel out deviations of beam spot diameters in the main scanning direction. Accordingly, scanning beam spot diameters in the main scanning direction can be maintained consistent over the entire effective writing region when the deflecting unit is being driven, so that favorable images can be formed.

[2] In the optical scanning device, the scan-imaging optical system includes a function of causing the light beam deflected by the deflecting unit to scan the scan target surface at a substantially constant speed.

Conventionally, when the scanning speed on the scan target surface has poor constancy (linearity), when dots are formed with uniform light emitting time lengths over the entire effective writing region, there may be deviations among the scanning beam spot diameters, which leads to degraded image quality.

In the optical scanning device described in [2], the scan-imaging optical system includes a function of causing the light beam deflected by the deflecting unit to scan the scan target surface at a constant speed. Accordingly, scanning beam spot diameters in the main scanning direction can be maintained consistent over the entire effective writing region when the deflecting unit is being driven, so that favorable images can be formed.

[3] In the optical scanning device, the scan target surface is divided into plural segments in a main scanning direction, and the pulse width information items included in each one of the plural segments are the same.

A large amount of memory is required for holding the pulse width information for each pixel, which leads to increased cost. However, in the optical scanning device described in [3], the scan target surface is divided into plural segments, and the pulse width information items which change in a stepwise manner are stored. Accordingly, costs required for the memory can be reduced.

[4] In the optical scanning device, the plural segments are determined by dividing the scan target surface in a symmetrical manner, with a center portion of the scan target surface in the main scanning direction located in the middle.

In the optical scanning device described in [4], the scan target surface is divided in a symmetrical manner. Accordingly, the amount of memory required for the pulse width information holding unit can be reduced, thereby reducing cost.

[5] In the optical scanning device, at least one of the plural segments has a scanning width that is different from those of the other plural segments.

In a scanning region with large differences in the scanning beam spot diameters, large differences would remain uncorrected even if the light source were driven based on the pulse width information. However, In the optical scanning device described in [5], in a scanning region with large differences in the scanning beam spot diameters, the scanning widths (division intervals) are set to be small. This reduces differences remaining uncorrected, so that scanning beam spot diameters can be made more consistent.

[6] In the optical scanning device (FIGS. 6 and 11B), the deflecting unit (oscillating mirror 106) includes a rotatable shaft, and deflects the light beam as the rotatable shaft causes the reflection surface to reciprocally oscillate; and when forming the predetermined pixels, the light source driving unit modulates/drives the light source in such a manner that pulse widths at peripheral portions along a scanning width of the scan target surface are shorter than a pulse width at the center portion of the scanning width of the scan target surface.

When a conventional polygon mirror that is often used in optical scanning devices is rotated at high speed, problems arise such as increased heat, vibration, noise, and power consumption. These problems can be solved by using a micro mirror with MEMS. However, the problem in this case is that the scanning speeds at the peripheral parts become lower than that at the middle part. This is because the reflection surface generally reciprocally oscillates according to sine waves. Thus, when the light beam passes through the above-described scan-imaging optical system maintaining constant speed, the beam spot diameters at the peripheral parts become larger than those at the middle part, which leads to degraded image quality.

The optical scanning device described in [6] uses, as the deflecting unit, a micro mirror in which the rotatable shaft causes the reflection surface to reciprocally oscillate. Accordingly, heat, vibration, noise, and power consumption can be reduced, and additionally, the scanning beam spot diameters can be maintained consistent over the entire effective writing region by controlling the light emitting time lengths to correct the deviation of beam spot diameters among different image heights, so that favorable images can be formed.

[7] In the optical scanning device, when forming the predetermined pixels, the light source driving unit modulates/drives the light source in such a manner that light emitting intensities at the peripheral portions along the scanning width of the scan target surface are shorter than a light emitting intensity at the center portion of the scanning width of the scan target surface.

In the optical scanning device described in [6], when the light emitting time length is changed for each scanning position, and pixels of the same size are formed, the integral light amount for forming each dot may change at the respective scanning positions.

However, in the optical scanning device described in [7], at scanning positions corresponding to relatively short light emitting time lengths, the light emitting intensity is intensified, so that the integral light amounts for forming pixels of the same size can be made consistent at the respective scanning positions, thereby forming favorable images.

[8] In the optical scanning device, the light source driving unit modulates/drives the light source in such a manner that a diameter of the light beam incident on the deflecting unit is shorter than an effective diameter of the deflecting unit.

In an optical system in which the light beam diameter is determined by the effective diameter of the deflecting unit (overfilled type optical system), the light beam diameters for scanning peripheral parts of the image become small. Therefore, a large amount of light is necessary at the peripheral parts. This makes it difficult to restrict the necessary maximum output of the light source (LD).

However, the optical scanning device described in [8] reduces the variation in the light amount at the respective scanning positions caused by the optical system. Accordingly, the necessary light amount at the peripheral parts of the image can be reduced, so as to be more applicable to high-speed optical scanning operations that require larger light amounts.

[9] In the optical scanning device, the reflection surface of the deflecting unit includes a metal film.

The reflectance ratio of the mirror surface that scans the scan target surface by deflection/reflection becomes deviated according to the incidence angle. Therefore, the light amount varies at the respective scanning positions, which is caused by the optical system.

In the optical scanning device described in [9], the metal film reduces deviations in the reflectance ratio according to the incidence angle. Accordingly, the optical scanning device described in [9] reduces the variation in the light amount at the respective scanning positions caused by the optical system. Therefore, by using the deflecting unit with such a metal film, the necessary light amount at peripheral parts of the image can be reduced, so as to be more applicable to high-speed optical scanning operations that require larger light amounts.

[10] In the optical scanning device, the light source driving unit includes a function of separately setting timings at which the light source is to start light emission for each pixel included in one line.

Due to various tolerance variations when manufacturing an optical scanning device, as the scanning speed on the scan target surface changes, the dot position becomes displaced in the main scanning direction.

However, in the optical scanning device described in [10], the timings at which the light source is to start light emission are separately set for each pixel. Thus, even when changing the scanning speed, the scanning speed can be corrected as if the speed were constant. Accordingly, the problem of displacement in dot positions is eliminated, and the beam spot diameters can be made consistent, thereby forming favorable images.

[11] The optical scanning device (FIGS. 1, 6, and 11B) further includes plural reflection mirrors (126 through 128, 130 through 132) configured to guide the light beam onto a plurality of the scan target surfaces (photoconductive drums 101 through 104), wherein a number of the plural reflection mirrors used for guiding the light beam onto at least one of the scan target surfaces is different from a number of the plural reflection mirrors used for each of the other scan target surfaces.

In the optical scanning device described in [11], the number of reflection mirrors is determined so that the light use efficiency corresponding to the respective scanning positions on the respective scan target surfaces becomes even more consistent. Accordingly, the optical scanning device described in [11] reduces the variation in the light amount at the respective scanning positions caused by the optical system. Therefore, the necessary light amount at peripheral parts of the image can be reduced, so as to be more applicable to high-speed optical scanning operations that require larger light amounts. Additionally, the freedom in the layout can be increased.

[12] In the optical scanning device, the least number of the plural reflection mirrors is applied for guiding the light beam onto one of the scan target surfaces used for forming images with a color material having the lowest brightness among color materials used in the optical scanning device.

A turn-around mirror is disposed in the light path, which increases the variations in light amount at the respective scanning positions.

However, in the optical scanning device described in [12], when an image is formed with the use of plural color materials, the color material having the lowest brightness has the highest visibility (for example, black, among yellow, magenta, cyan, and black). Therefore, the number of reflection mirrors is reduced for the color material having the lowest brightness. This reduces the variation in the light amount at the respective scanning positions for the color material with the highest visibility, so that the degraded image quality can be unnoticeable.

[13] In the optical scanning device, the scan-imaging optical system includes at least a single scanning lens (122 through 125) provided for each of the scan target surfaces; and the single scanning lens includes a function of preventing dust.

Dust prevention glass, which is generally provided for sealing the optical scanning device, may increase the variation in the light amount at the respective scanning positions.

However, in the optical scanning device described in [13], each of the scanning lenses also functions as dust prevention glass, thereby reducing the variation in the light amount at the respective scanning positions.

[14] According to an aspect of the present invention, there is provided an image forming apparatus including the optical scanning device.

In the image forming apparatus described in [14], the scanning beam spot diameter can be made consistent over the entire effective writing region, thereby providing an image forming apparatus capable of forming favorable images.

According to one embodiment of the present invention, an optical scanning device and an image forming apparatus including the same are provided, which are capable of maintaining consistent scanning beam spot diameters in the main scanning direction throughout the respective scanning positions on the scan target surface, reducing the beam spot diameter, and forming high-resolution images. Furthermore, an image forming apparatus can be provided, which is capable of forming high-quality images by maintaining consistent beam spot diameters in the main scanning direction, and which is suited for the office environment as noise and power consumption can be reduced. Furthermore, an image forming apparatus can be provided, in which a micro mirror is used as the deflecting unit so that a thin housing can be used as a result of reduced vibration, thus reducing the weight and the cost of the apparatus, and consequently being environmentally friendly as power consumption is reduced.

The present invention is not limited to the specifically disclosed embodiment, and variations and modifications may be made without departing from the scope of the present invention.

The present application is based on Japanese Priority Patent Application No. 2008-029972, filed on Feb. 12, 2008, the entire contents of which are hereby incorporated herein by reference.

What is claimed is:

1. An optical scanning device comprising:
   a light source;
   a pixel clock generating unit configured to modulate a phase of a pixel clock and a drive time period of the pixel clock corresponding to scanning positions on a scan target surface;
   a pulse width information memory storing pulse width information corresponding to drive time periods of the pixel clock generated by the pixel clock generating unit;
   a light source driving unit configured to modulate/drive an intensity of a light beam emitted from the light source based on the pulse width information corresponding to drive time periods of the pixel clock generated by the pixel clock generating unit;
   a deflecting unit comprising a reflection surface configured to deflect/scan a light beam from the light source; and
   a scan-imaging optical system configured to image the light beam deflected by the deflecting unit on the scan target surface, wherein
   the deflecting unit further comprises a rotatable shaft and the reflection surface deflects the light beam as the rotatable shaft reciprocally oscillates the reflection surface, and
   the pixel clock generating unit modulates the pixel clock such that the drive time at peripheral portions along a scanning width of the scan target surface is shorter than the drive time at a center portion of the scanning width of the scan target surface.

2. The optical scanning device according to claim 1, wherein
   the light beam deflected by the deflecting unit scans the scan target surface at a substantially constant speed based on the configuration of the scan-imaging optical system.

3. The optical scanning device according to claim 1, wherein
   the scan target surface is divided into plural segments in a main scanning direction, the pulse width information is divided into plural segments in association with the plural segments of the scan target surface, and the pulse width information associated with a respective one of the plural segments is the same throughout the segment.

4. The optical scanning device according to claim 3, wherein
   the plural segments of the scan target surface are determined by symmetrically dividing the scan target surface to position one of the plural segments across a center portion of the scan target surface in the main scanning direction located in the middle of the plural segments.

5. The optical scanning device according to claim 3, wherein
   at least one of the plural segments of the scan target surface has a scanning width that is different from those of the other plural segments of the scan target surface.

6. The optical scanning device according to claim 1, wherein
   the light source driving unit modulates/drives the intensity of the light beam emitted from the light source such that light emitting intensities at peripheral portions along the scanning width of the scan target surface are greater than light emitting intensities at the center portion of the scanning width of the scan target surface.

7. The optical scanning device according to claim 1, wherein
   the pixel clock generating unit modulates the pixel clock such that a diameter of the light beam incident on the deflecting unit is shorter than an effective diameter of the deflecting unit.

8. The optical scanning device according to claim 1, wherein
   the reflection surface of the deflecting unit comprises a metal film.

9. The optical scanning device according to claim 1, wherein
   the light source driving unit separately sets timings at which the light source starts light emission for each pixel included in one line.

10. The optical scanning device according to claim 1, further comprising:
    plural reflection mirrors configured to guide the light beam onto a plurality of scan target surfaces, wherein
    a number of the plural reflection mirrors used for guiding the light beam onto at least one of the plurality of scan target surfaces is different from a number of the plural reflection mirrors used for each other of the plurality of scan target surfaces.

11. The optical scanning device according to claim 10, wherein
    a least number of the plural reflection mirrors is used to guide the light beam onto one of the scan target surfaces forming images with a color material having a lowest brightness among color materials used in the optical scanning device.

12. The optical scanning device according to claim 10, wherein
    the scan-imaging optical system comprises at least a single scanning lens for each of the scan target surfaces, each of the single scanning optical lenses fixed at a position to prevent dust.

13. The optical scanning device according to claim 10, included in an image forming apparatus.

* * * * *